(12) United States Patent
Granneman

(10) Patent No.: US 6,677,588 B1
(45) Date of Patent: Jan. 13, 2004

(54) DETECTOR ASSEMBLY HAVING REDUCED STRAY LIGHT GHOSTING SENSITIVITY

(75) Inventor: Russell D. Granneman, Goleta, CA (US)

(73) Assignee: Raytheon Company, Lexington, MA (US)

(*) Notice: Subject to any disclaimer, the term of this patent is extended or adjusted under 35 U.S.C. 154(b) by 1,826 days.

(21) Appl. No.: 07/292,023

(22) Filed: Dec. 13, 1988

(51) Int. Cl.[7] .............................. G01J 5/00; H01J 3/14; G02B 27/00
(52) U.S. Cl. ............... 250/338.1; 250/237; 250/347; 359/601
(58) Field of Search ................. 250/237 R, 338.1, 250/347, 237; 359/601

(56) References Cited

U.S. PATENT DOCUMENTS 2,427,528 A * 9/1947 Hickok .................. 250/237 R
4,375,332 A * 3/1983 Yokota et al. .......... 250/237 R

* cited by examiner

Primary Examiner—Stephen C. Buczinski
(74) Attorney, Agent, or Firm—William C. Schubert; Glenn H. Lenzen, Jr.

(57) ABSTRACT

An improved detector assembly 10 having decreased sensitivity both to Narcissism and to stray light ghosting is disclosed herein. The improved detector assembly 10 of the present invention includes a housing 70 having an input aperture 142 in communication with a chamber within said housing. A detector 130 for sensing electromagnetic energy passing through the input aperture 142 within a first field of view is mounted within the chamber. Also mounted within the chamber is a detector mirror 100 for reflecting energy passing through the input aperture 142 within a second field of view outside of the first field of view. The improved assembly 10 of the present invention further includes a second mirror 110 mounted within the chamber for reflecting energy reflected by the first mirror 100 through the input aperture 142.

10 Claims, 2 Drawing Sheets

DETECTOR ASSEMBLY HAVING REDUCED STRAY LIGHT GHOSTING SENSITIVITY

BACKGROUND OF THE INVENTION

1. Field of the Invention

This invention relates to imaging systems. More specifically, this invention relates to apparatus used to detect electromagnetic radiation irradiating such systems.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Forward Looking Infrared (FLIR) thermal imaging systems are generally used to view scenes by using the infrared energy emitted by the scene. FLIR systems commonly include a telescope, imaging optics and a dewar. The dewar contains a detector which emits a signal in response to infrared energy emitted by the scene. Typically, the detector is cooled to less than one hundred degrees Kelvin to reduce internal thermal noise and thereby improve sensitivity. A cooled coldshield is also typically installed within the dewar. This coldshield is configured so -as to not vignette (obscure) radiation focused on the detector by the telescope and imaging optics. Further, the coldshield enhances system performance by minimizing the amount of radiation striking the detector from sources other than the scene.

The performance of FLIR systems may be degraded by several optical phenomena. Included among these potential difficulties are ghosting (a form of stray light) and narcissism. Ghosting occurs when radiation either inside or ouside of the instantaneous field of view (IFOV) is partially reflected off (typically two) surfaces and thereby laterally displaced from the original radiation path. This errant radiation then strikes the detector at a location different from that at which it would had the radiation not been laterally displaced. Hence, the detector sees multiple images of the radiation source.

Narcissus, as implied by the term, occurs when the detector sees an image of the cold portion of itself (or of cold structures within the dewar) superimposed on the image of the scene. For this "cold image" to be detrimental to system performance it must be time-varying, as is the case in scanned systems. In addition, the narcissus generating partially reflecting surface(s) must lie beyond the scanner from the detector. Unfortunately, the detector sees a very cold narcissistic image when the scanner mirror is "on axis" and looking back into the cold dewar, but sees a relatively constant warm image when the scanner mirror moves slightly off axis. This generates a "cold spike" background as the scanner mirror moves through the "on axis" position. Moreover, the cold spike is generally located in the center of the resultant image—typically that part of the scene in which the viewer is most interested.

At least two characteristics of a given FLIR system directly impact the severity of potential narcissus problems. The first pertains to the reflectance of the narcissistic surface (s). A higher reflectance will result, proportionally, in a colder spike. Second, the curvature of the reflecting surface defines the degree of focus of the narcissistic image. If the curvature is such that the surface is normal to all incident rays from the detector, then the detector will see a sharply focused image of itself.

Several schemes have been employed to mitigate narcissism. In one such scheme the system is designed so as to minimize "detector to detector" imagery. That is, optical surfaces within the system are adjusted so that reflections onto the detector are "defocused." Unfortunately, this correction of narcissism by design, although favorable, is sometimes limited in efficacy by other constraints.

A second partial remedy for narcissism is known to those skilled in the art as ARC-NARC (Automatic Responsivity Correction Narcissus). This approach involves the superposition of an image of a warm source over the narcissistic image on the detector. At the point in time when the scanning mirror is positioned such that the detector "sees" itself most fully, the detector will also see a superimposed image of the warm source. By adjusting the temperature of the warm source, the narcissistic cold spike in the resultant scene image is ostensibly masked by the image of the warm source. However, difficulties in "matching" the (blackbody) radiation curves associated with the warm and cold sources to generate a resultant radiation profile indistinguishable from that of the ambient environment have limited the efficacy of this technique.

A third technique employed for reducing narcissism involves filtering to a relatively narrow spectral band radiation from the scene that is seen by the detector. This technique, however, cannot be expected to remedy narcissism to the extent desired in certain FLIR applications.

In a fourth method of narcissus reduction, a "detector mirror" is placed within the dewar immediately in front of the detector. The mirror has an aperture so as to not vignette the field of view of the detector. The center of curvature of the mirror is typically located on the optical axis at the center of the coldshield aperture. Any ray passing through the aperture and striking the detector mirror is reflected back out the aperture at a conjugate height from the optical axis. Thus, if one were looking into the dewar of this configuration, the detector would be the only cold appearing object. The detector mirror would appear warm because the viewer would be looking back at an inversed image of the viewer (warm). The coldshield outer surface is typically gold plated for thermal considerations, so the viewer would see the warm "outside" world in reflection off this surface. That leaves only the detector itself to appear cold. The detector mirror in effect optically transforms certain "physically cold" objects within the field of view of the detector into appearing warm. The detector mirror provides the added benefit of reducing the thermal load on the dewar by reflecting radiation which would normally be absorbed thereby. Although this approach may result in a reduction in narcissism, the efficacy of this approach is limited when the detector image is sharply focused onto the detector.

Further, although detector mirrors reduce narcissism while leaving most other aspects of optical performance essentially unchanged, detector mirrors tend to contribute to ghosting. In particular, radiation entering the aperture in the coldshield which is not focused on the detector (i.e. stray light) may be reflected by the detector mirror, This reflected stray light may again be reflected by other surfaces onto the detector, thus generating image ghosts. It follows that the addition of the detector mirror may increase the susceptibility of the system to stray light ghosting.

Hence a need in the art exists for an infrared detection apparatus having decreased sensitivity both to narcissism and to stray light ghosting.

SUMMARY OF THE INVENTION

The need in the art for an infrared detection apparatus having decreased sensitivity both to narcissism and to stray light ghosting is addressed by the improved detector assembly of the present invention. The improved detector assembly of the present invention includes a housing having an input aperture (coldshield) in communication with a chamber within the housing. A detector for sensing electromagnetic energy passing through the input aperture within a first field of view is mounted within the chamber. Also mounted within the chamber is a first mirror for reflecting energy passing through the input aperture within a second field of view outside of the first field of view. The improved assembly of the present invention further includes a second mirror mounted within the chamber for reflecting energy reflected by the first mirror through the input aperture.

DETAILED DESCRIPTION OF THE INVENTION

Figure 1:
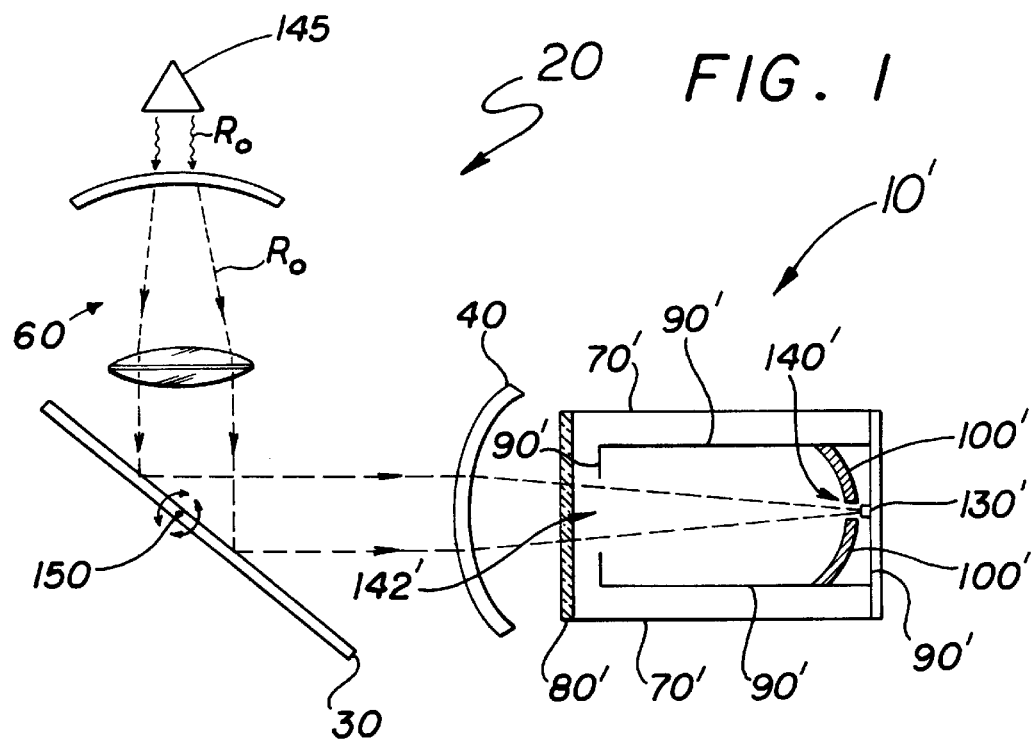
FIG. 1 is a top plan view of a scanning imaging system which includes a conventional infrared detection apparatus.

FIG. 1 shows a top plan view of a conventional infrared dewar (detection apparatus) 10'. In FIG. 1 the dewar 10' is included within a scanning imaging system 20. The imaging system 20 includes an optical telescope 60 for collecting infrared energy from a scene 145. The collected infrared energy from the scene 145 is reflected by a scanning mirror 30 to an imaging/relay optical lens 40.

As discussed below, the conventional dewar 10' includes an outer housing 70', a dewar window 80', a coldshield 90', a detector mirror 100', and a radiation detector 130'. As mentioned in the Background of the Invention, the detector mirror 100' is included within the conventional dewar 10' to reduce narcissism. The spectral transmission characteristics of the window 80' are typically controlled by the application of a suitably reflective coating known to those skilled in the art. An aperture 140' is included in the detector mirror 100' so as not to vignette (obscure) the field of view of the detector 130'. Similarly, an aperture 142' is defined by the coldshield 90' to allow radiation reflected by the scanning mirror 30 to be collected by the detector 130'.

As shown in FIG. 1, infrared radiation $R_o$ emitted by objects within the scene 145 to be imaged is collected by the telescope 60 and typically collimated before being reflected by the mirror 30. After being reflected by the mirror 30, the radiation is focused by the imaging optics 40 passed through the window 80' and aperture 142', and is incident on the detector 130. The detector 130' modulates an electrical signal in response to the energy received thereby $R_o$. Processing electronics (not shown) associate the modulated signal with the instantaneous orientation of the scanning mirror 30 to construct an image of the scene 145.

Figure 2:
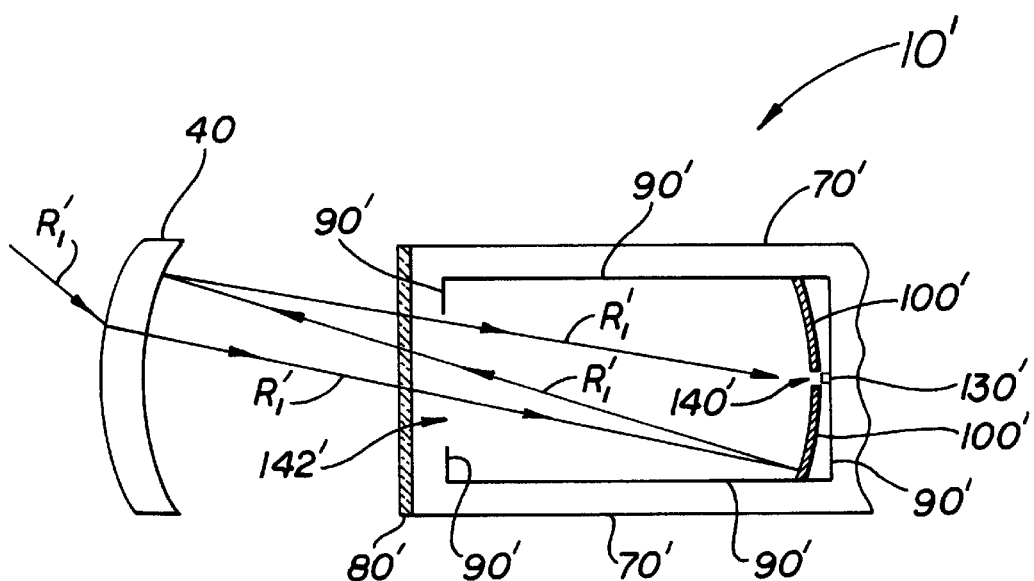
FIG. 2 is a magnified top sectional view of the conventional detection apparatus of FIG. 1.

FIG. 2 is a magnified top sectional view of the conventional dewar 10'. As shown in FIG. 2, the housing 70' forms an evacuated chamber. Typically, the window 80' is substantially optically transparent and forms a vacuum seal with the housing 70'. The detector 130' generally comprises a conventional infrared photon detector and has a field of view defined by the aperture 142' in the coldshield 90'. The detector 130' may also be fabricated from materials familiar to those skilled in the art (e.g. lead sulfide or lead telluride). In the embodiment of FIG. 2 the detector 130' is cooled to reduce the amount of noise (undesired thermally generated radiation) sensed thereby.

The coldshield 90' surrounds the detector 130' and the detector mirror. 100'. The coldshield 90' is fabricated from thermally conductive material (e.g. metal) and is typically thermally coupled to a heat sink or other suitable cooling apparatus. Interior surfaces of the coldshield 90' are generally painted black.

In the embodiment of FIG. 2 the detector mirror 100' is a concave reflecting mirror. An aperture 140' located at the center of curvature of the detector mirror 100' is included so as not to vignette (obscure) the field of view of the detector 130'.

Although the detector mirror 100' reduces narcissism, as mentioned in the Background of the Invention the detector mirror 100' typically increases the sensitivity of the apparatus 10' to ghosting. As shown in FIG. 2, the stray light ray $R_1'$ (from outside the field of view of the detector 130') is incident on the lens 40. After passing through the window 80' and aperture 142', the ray $R_1'$ is reflected by the detector mirror 100' back out of the dewar 10'. The ray $R_1'$ is reflected out at a conjugate height with a probability that it will strike a surface, such as the lens 40 at such an angle so as to be reflected back to the detector 130'. In this manner the detector mirror 10' contributes to ghosting within the conventional dewar 10' by reflecting stray light from outside of the field of view of the detector 130'.

Figure 3:
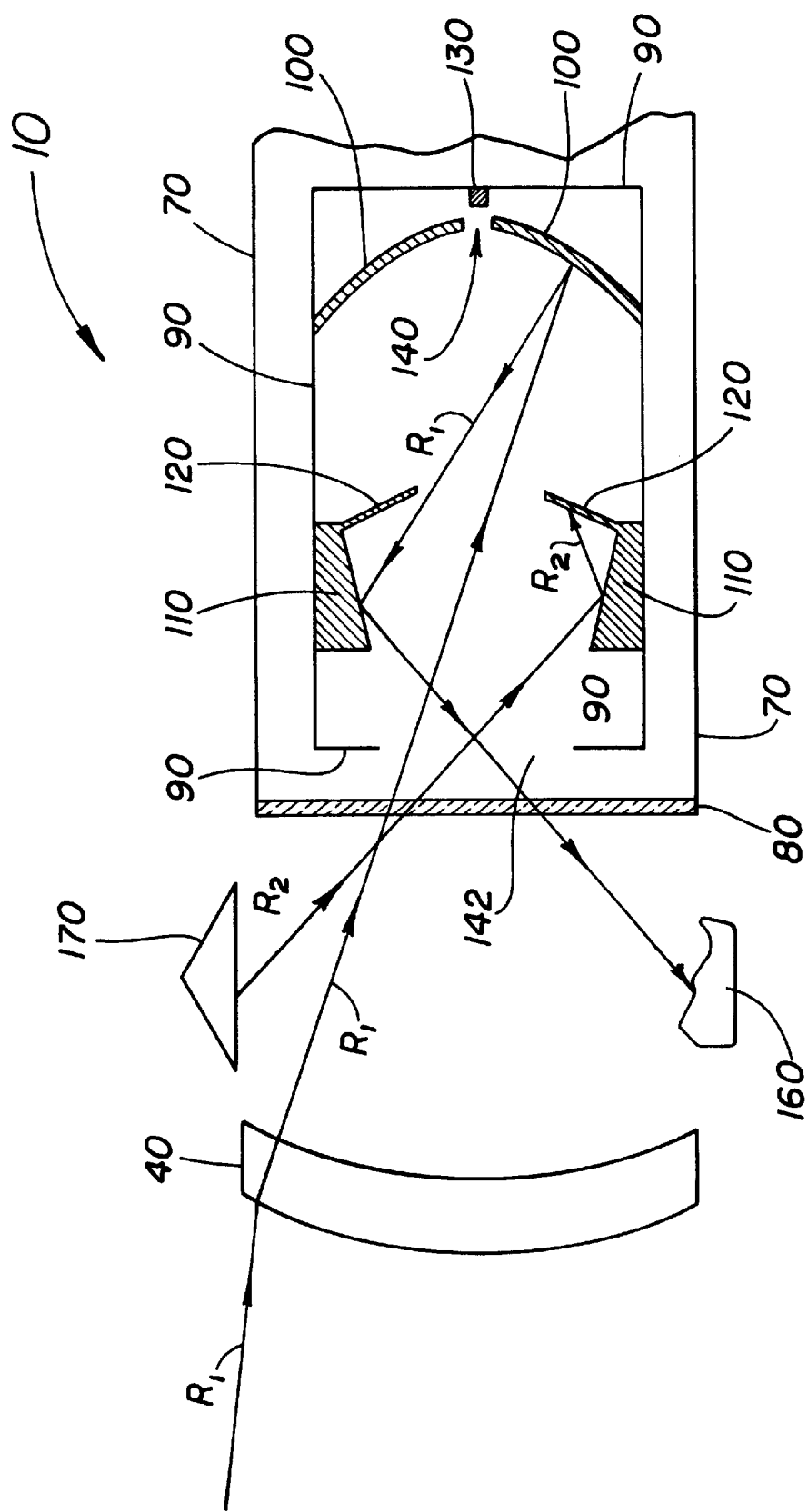
FIG. 3 is a top sectional view of the improved detector assembly of the present invention.

The improved detector assembly 10 of the present invention substantially inhibits the stray light induced ghosting experienced by the conventional dewar 10' above. FIG. 3 shows a top sectional view of the improved detector assembly 10 of the present invention. As described more fully below, the assembly 10 includes an outer housing 70, a dewar window 80, a coldshield 90, a detector mirror 100, an anti-ghosting mirror 110, a radiation shield 120 and a radiation detector 130. Again, the window 80 is typically coated with a spectral bandpass filter to limit its spectral transmission characteristics. An aperture 142 is formed by the coldshield opening limiting the radiation to the detector 130.

The detector mirror 100 is a concave reflective surface mirror. For simplicity, in the embodiment of FIG. 3 the detector mirror 100 is secured to the coldshield 90 by conventional means. The mirror 100 is not limited to such an attachment configuration since it can be physically warm or cold if adequate precautions are taken to reduce stray light therefrom. An aperture 140 is located at the center of curvature of the detector mirror 100 so as not to vignette (obscure) the field of view of the detector 130. The radius of curvature, conic constant and higher order coefficients of the mirrors 100 and 110 are such that radiation passing through the aperture 142 and striking the mirror 100 is reflected to the anti-ghosting mirror 110 and then reflected to the light trap 160.

For example, as shown in FIG. 3 a stray light ray $R_1$ from outside of the field of view of the detector 130 strikes the detector mirror 100 after passing through the lens 40, the window 80 and the coldshield aperture 142. The ray $R_1$ is reflected by the detector mirror 100 to the anti-ghosting mirror 110. The anti-ghosting mirror 110 redirects the ray $R_1$ through the coldshield aperture 142 to a light trap 160. The light trap 160 may be comprised of a variety of optically absorptive materials known to those skilled in the art. In this manner the assembly 10 of the present invention has prevented the detector 130 from seeing the stray light $R_1$ via reflection from the detector mirror 100, while still retaining desirable anti-narcissus characteristics.

In the preferred embodiment, the anti-ghosting mirror 110 is annular in shape and circumscribes the field of view of the detector 130. Those skilled in the art will recognize other shapes for the anti-ghosting mirror within the scope of the invention. In the embodiment of FIG. 3, the anti-ghosting mirror 110 is contiguous and "specularly" reflective. That is, radiation is reflected by the anti-ghosting mirror 110 in primarily a controlled, linear (as opposed to diffuse) manner.

The specularly reflective nature of the anti-ghosting mirror 110 allows determination of appropriate locations for placement of stray light collection devices (e.g. the light trap 160) outside of the housing 70. For example, with knowledge of the radius of curvature of the detector mirror 100 and the reflective properties of the anti-ghosting mirror 110, one skilled in the art may appropriately place the light trap 160 for collection of the ray $R_1$.

In alternative embodiments of the present invention the position of the anti-ghosting mirror 110 may vary from that shown in FIG. 3. Of course, translation of the anti-ghosting mirror 110 would require appropriate adjustment of the radius of curvature of the detector mirror 100 and relocation of the light trap 160.

Given the relative positions of the mirrors 100 and 110 shown in FIG. 3, computer programs known to those skilled in the art (such as "Code-5" by optical Research Associates of Pasadena, Calif.) may be utilized to determine precise relationships between the optical parameters of the mirrors 100 and 110 such that stray light incident upon the detector mirror 100 follows an optical path similar to that of the ray $R_1$. Specifically, parameters of the detector mirror 100 may be selected such that for substantially all angles of incidence of the ray $R_1$ upon the detector mirror 100 the ray $R_1$ will be reflected to the anti-ghosting mirror 110. Similarly, parameters of the anti-ghosting mirror 110 may be chosen so that the anti-ghosting mirror 110 redirects substantially all reflections of stray light from the detector mirror 100 out of the assembly 10 through the aperture 142. These parameters may typically include the radius of curvature, conic constant and other optical surface characteristics of the detector mirror 100 and the anti-ghosting mirror 110.

A comparison of the ray paths $R_1'$ of FIG. 2, and $R_1$ of FIG. 3 makes it apparent that the anti-ghosting mirror 110 reduces the stray light susceptibility of the system 10. As shown in FIG. 3, the radius of curvature of the detector mirror 100 and placement of the anti-ghosting mirror 110 are chosen such that the ray $R_1$ is collected by the light trap 160. In contrast, as shown in FIG. 2 the radius of curvature chosen for the detector mirror 100' in the conventional apparatus 10' may result in a reflection of the ray $R_1'$ by the surface of the lens 40' and thereby cause ghosting.

As shown in FIG. 3, the radiation shield 120 is attached to the anti-ghosting mirror 110. In the embodiment of FIG. 3 the shield is annular in shape and comprised of an optically absorptive material. the shield 120 is secured to the anti-ghosting mirror 110 by conventional means (e.g. glue, epoxy). The shield 120 is positioned between the anti-ghosting mirror 110 and the detector 130 such that radiation reflected by the anti-ghosting mirror 110 does not directly illuminate the detector 130. In an alternative embodiment the shield 120 is positioned between the anti-ghosting mirror 110 and detector 130 as described above but is secured directly to the coldshield 90.

An example of the utility of the shield 120 in decreasing the stray light susceptibility of the assembly 10 may be appreciated by considering the stray light ray $R_2$ shown in FIG. 3. The ray $R_2$ is emitted by a surface 170 outside of the field of view of the detector 130. As shown in FIG. 3, the ray $R_2$ passes through both the window 80 and the aperture 142 and is then reflected by the anti-ghosting mirror 110. Next, the shield 120 absorbs the ray $R_2$ following reflection by the anti-ghosting mirror 110. In this manner the shield 120 prevents the reflected ray $R_2$ from being collected by the detector 130. Further, the shield 120 prevents the detector 130 from "seeing" reflections (e.g. such as from the mirror 110) from outside of the intended field of view. The surface of 120 facing the detector is typically painted black.

Thus the present invention has been described with reference to a particular embodiment in connection with a particular application. Those having ordinary skill in the art and access to the teachings of the present invention will recognize additional modifications and applications within the scope thereof. For example, mirrors of shapes and orientations differing from those of the anti-ghosting mirror 110 of the illustrative embodiment may be utilized to redirect optical energy reflected by the detector mirror 100 to regions external to the assembly 10 without departing from the scope of the present invention. Similarly, with access to the teachings of the present invention, one skilled in the art may chose other appropriate locations for the placement of additional mirrors to further reduce the stray light susceptibility of the assembly 10. The invention is similarly not limited to the particular shape or placement of the radiation shield 120 disclosed herein. As mentioned above, a securing of the shield 120 directly to the coldshield 90 may be appropriate in alternative embodiments of the present invention. Additionally, more than one radiation shield may be employed without departing from the scope of the present invention.

It is therefore contemplated by the appended claims to cover any and all such applications, modifications and embodiments.

What is claimed is:

1. An improved detector assembly comprising:
   a housing having an input aperture in communication with a chamber within said housing;
   detector means mounted within said chamber for sensing electromagnetic energy passing through said aperture within a first field of view;
   first mirror means mounted within said chamber for reflecting energy passing through said aperture within a second field of view outside said first field of view; and
   second mirror means mounted within said chamber for reflecting energy reflected from said first mirror means through said aperture;
   said second field of view being defined by said aperture and said second mirror means; and
   said first mirror means being configured so that substantially all energy passing through said aperture within said first and second fields of view and reflected by said first mirror means is reflected by said first mirror means to said second mirror means.

2. An improved detector assembly of claim 1 further including shield means for blocking energy passing through said aperture within a third field of view outside of said second field of view.

3. An improved detector assembly as in claim 1, further comprising:
   light trap means positioned outside of said chamber for absorbing energy reflected by said first mirror means.

4. An improved infrared detector assembly comprising:
   a housing having an input aperture in communication with a chamber within said housing;

a coldshield mounted within said chamber;

an infrared detector mounted within said coldshield for sensing infrared energy passing through said aperture within a first field of view;

first mirror means mounted within said chamber for reflecting energy passing through said aperture within a second field of view outside said first field of views; and second mirror means mounted within said chamber for reflecting energy reflected from said first mirror means through said aperture;

said second field of view being defined by said aperture and said second mirror means; and said first mirror means being configured so that substantially all energy passing through said aperture within said first and second fields of view and reflected by said first mirror means is reflected by said first mirror means to said second mirror means.

5. An improved infrared detector assembly comprising:

a housing having an input aperture in communication with a chamber within said housing;

a coldshield mounted within said chamber;

an infrared detector mounted on said coldshield for sensing infrared energy passing through said aperture within a first field of view;

first mirror means mounted within said chamber for reflecting energy passing through said aperture within a second field of view outside said first field of views; and second mirror means mounted within said chamber for reflecting energy reflected from said first mirror means through said aperture;

said second field of view being defined by said aperture and said second mirror means;

said first mirror means being configured so that substantially all energy passing through said aperture within said first and second fields of view and reflected by said first mirror means is reflected by said first mirror means to said second mirror means; and shield means for blocking energy passing through said aperture within a third field of view outside of said second field of view.

6. The improved assembly of claim 5 wherein said first mirror means includes a concave parabolic mirror with a first aperture at the center thereof.

7. The improved assembly of claim 6 wherein said first aperture circumscribes said first field of view.

8. The improved assembly of claim 7 wherein said second mirror means circumscribes said first field of view.

9. The improved assembly of claim 8 wherein said second mirror means includes an annular mirror.

10. An improved infrared detector assembly comprising:

a housing having an input aperture in communication with a chamber within said housing:

a coldshield mounted within said chamber;

an infrared detector mounted on said coldshield for sensing infrared energy passing through said aperture within a first field of view;

a first mirror having a first aperture at the center thereof and mounted within said chamber for reflecting energy passing through said aperture within a second field of view outside said first field of view, said aperture circumscribing said first field of view;

a second mirror mounted within said chamber for reflecting energy reflected from said first mirror means through said aperture; said second mirror circumscribing said first field of view, said second field of view being defined by said aperture and said second mirror, said first mirror being configured so that substantially all energy passing through said aperture within said first and second fields of view and reflected by said first mirror is reflected by said first mirror and said second mirror; and shield means attached to said second mirror for absorbing energy passing through said aperture and reflected by said second mirror, said shield means being positioned to intersect an optical path between said second mirror and said infrared detector.

\* \* \* \* \*

UNITED STATES PATENT AND TRADEMARK OFFICE
CERTIFICATE OF CORRECTION

PATENT NO. : 6,677,588 B1
DATED : January 13, 2004
INVENTOR(S) : Russell D. Granneman It is certified that error appears in the above-identified patent and that said Letters Patent is hereby corrected as shown below:

Column 5,
Line 5, insert the following:
-- RIGHTS OF THE GOVERNMENT
This invention was made with Government support under contract No. F33615-83-C-1118 awarded by the Department of the Air Force. The Government has certain rights in this invention. --

Signed and Sealed this

Twelfth Day of October, 2004

JON W. DUDAS
*Director of the United States Patent and Trademark Office*